42-63 SR
FIP8305 OR AI 126
[redacted]
2 Sheets—Sheet 1.
F. D. NEWBURY.
Revolver.
No. 126.
A. I. Patented July 31, 1855.
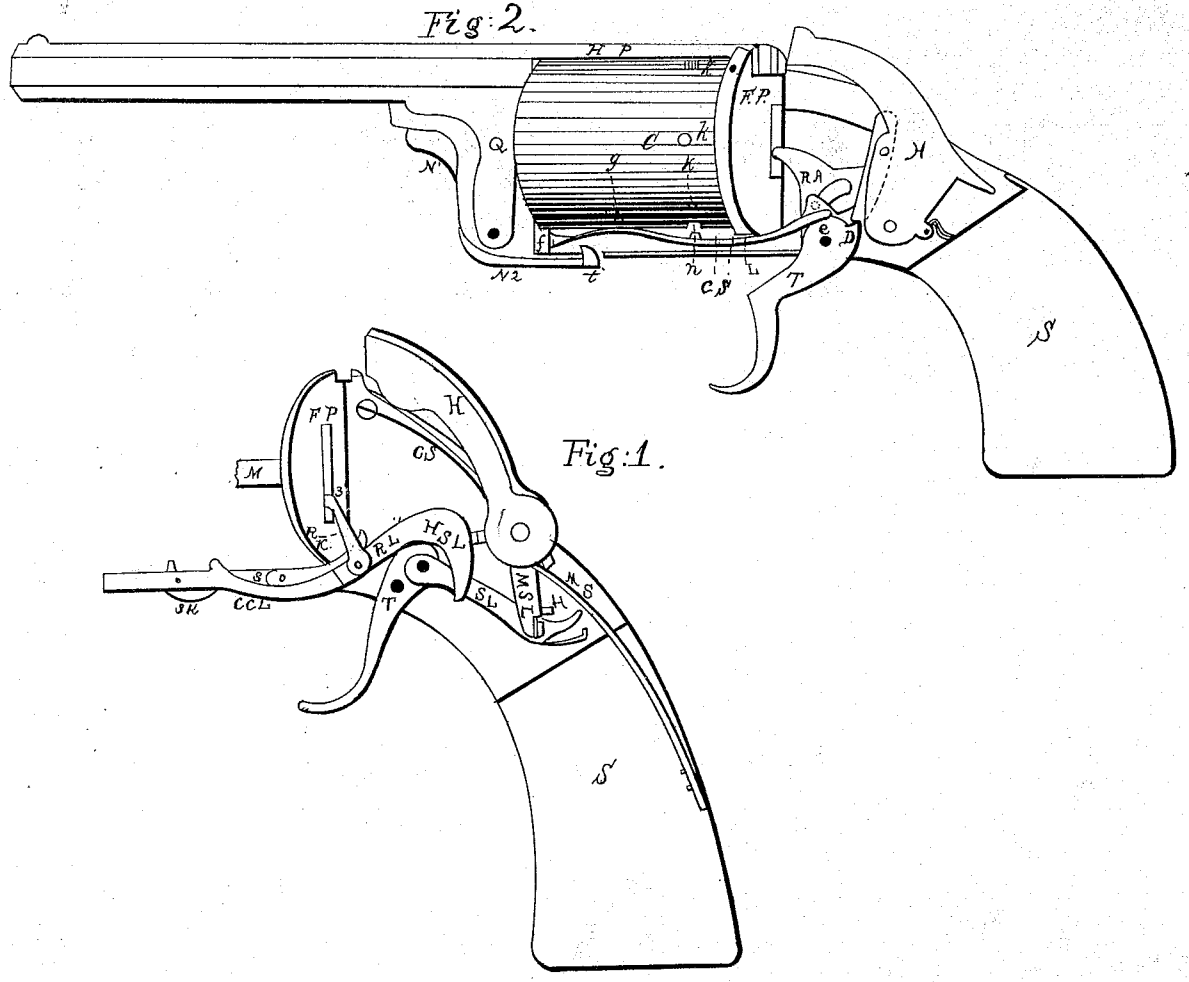
Witnesses.
Richard Varick DeWitt
W. C. Miller
Inventor.
F. Newbury
N. PETERS, PHOTO-LITHOGRAPHER, WASHINGTON, D. C.

2 Sheets—Sheet 2.
F D. NEWBURY.
Revolver.
No. 126.
A. I. Patented July 31, 1855.
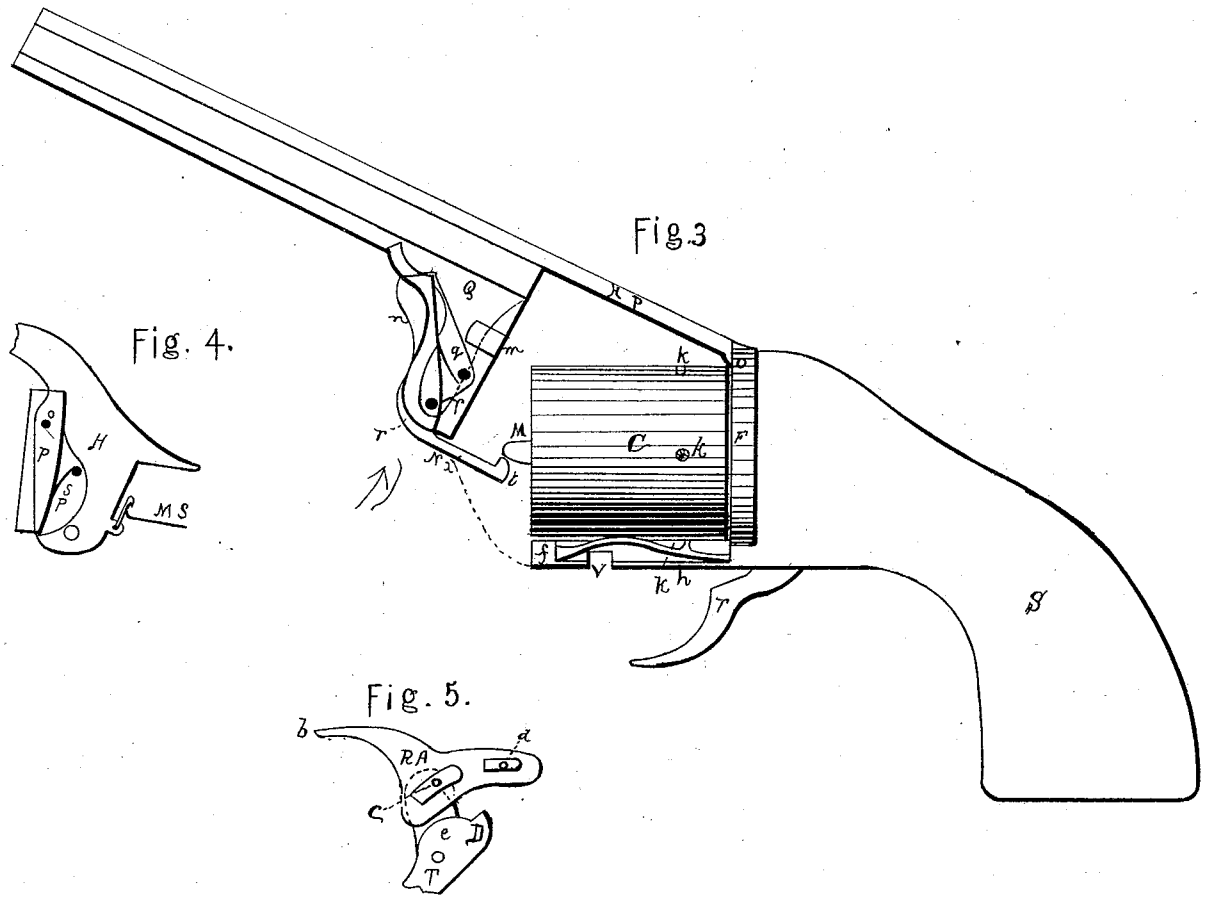
Wilnesses.
Inventor.
L. Newbury
N. PETERS, PHOTO-LITHOGRAPHER, WASHINGTON, D. C.